United States Patent
Kim

(10) Patent No.: US 7,300,314 B2
(45) Date of Patent: Nov. 27, 2007

(54) SOCKET FOR TRANS-FLASH MEMORY CARD

(75) Inventor: Soo-Hoon Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/242,156

(22) Filed: Oct. 3, 2005

(65) Prior Publication Data

US 2006/0079133 A1    Apr. 13, 2006

(30) Foreign Application Priority Data

Oct. 12, 2004  (KR) .................. 10-2004-0081457

(51) Int. Cl.
  *H01R 24/00* (2006.01)
(52) U.S. Cl. ............................................... 439/630
(58) Field of Classification Search ............... 439/630, 439/377, 259, 160, 945
  See application file for complete search history.

(56) References Cited

U.S. PATENT DOCUMENTS

| | | | |
|---|---|---|---|
| 5,313,596 A * | 5/1994 | Swindler et al. ............ 710/303 |
| 5,934,920 A * | 8/1999 | Ito et al. ..................... 439/159 |
| 6,101,372 A * | 8/2000 | Kubo ........................... 455/558 |
| 6,241,545 B1 * | 6/2001 | Bricaud et al. .............. 439/326 |
| 6,261,113 B1 * | 7/2001 | Chen ............................ 439/260 |
| 6,602,096 B1 * | 8/2003 | Kronestedt et al. ......... 439/630 |
| 6,695,637 B1 * | 2/2004 | Liu .............................. 439/377 |
| 6,717,805 B2 * | 4/2004 | Liu et al. .................... 361/684 |
| 6,717,817 B2 * | 4/2004 | Liu et al. .................... 361/737 |
| 6,795,651 B2 * | 9/2004 | Silverbrook ................ 396/429 |
| 6,884,102 B2 * | 4/2005 | Rumpel et al. ............. 439/331 |
| 6,932,652 B1 * | 8/2005 | Chen ........................... 439/630 |
| 6,971,919 B1 * | 12/2005 | Huang ........................ 439/630 |
| 6,993,368 B2 * | 1/2006 | Schlegel ................... 455/569.2 |
| 7,125,258 B2 * | 10/2006 | Nakakubo et al. ........... 439/64 |

FOREIGN PATENT DOCUMENTS

| JP | 00216082 | 8/2002 |
|---|---|---|
| JP | 00045559 | 2/2003 |

* cited by examiner

*Primary Examiner*—Tulsidas C. Patel
*Assistant Examiner*—Harshad C Patel
(74) *Attorney, Agent, or Firm*—The Farrell Law Firm

(57) ABSTRACT

A socket for installing a removable memory card in a device is provided having a hook switch mounted on a mainboard of a device and electrically connected thereto, and a sliding tray is insertable into the tray socket from a position extended from the device to make an electrical contact with the tray socket. The sliding tray is alternately retracted and extended by the hook switch when the sliding tray is repeatedly pushed, and a memory socket is installed or formed on an top surface of the sliding tray, for accommodating a memory card and electrically connecting the memory card to the tray socket through the sliding tray.

21 Claims, 10 Drawing Sheets

Memory Card

SOCKET FOR TRANS-FLASH MEMORY CARD

PRIORITY

This application claims priority under 35 U.S.C. § 119 to an application entitled "Socket For Trans-Flash Memory Card" filed in the Korean Intellectual Property Office on Oct. 12, 2004 and assigned Ser. No. 2004-0081457, the contents of which are incorporated herein by reference.

BACKGROUND OF THE INVENTION

1. Field of the Invention

The present invention relates to an apparatus for installing a small-sized removable memory card, such as a trans-flash memory card, in a terminal, and more particularly, to a socket for installing a trans-flash memory card in a terminal, the socket providing a reliable connection between the trans-flash memory card and the terminal and preventing the trans-flash memory card from breakage that may easily occur during installing and uninstalling due to its small size, thereby improving reliability of the terminal.

2. Background of the Prior Art

Nowadays, almost everyone possesses one or more portable wireless terminals owing to the rapidly developing electronic and communication industry. Therefore, users demand a terminal having various additional functions in addition to basic calling service, and accordingly terminals of various additional functions are consistently introduced into the market to satisfy such demand.

There are a number of additional functions in the portable wireless terminal: including basic Internet connection, video on demand (VOD), MP3 replay, digital camera using small-sized lens assembly, camcorder, access to various contents, and so on. That is, increasing numbers of functions, demanded in users' everyday life, are made possible with the wireless terminal.

To carry out the various functions, the terminal requires large memory capacity, and therefore terminal manufacturers are trying to make terminals that can efficiently use various kinds of removable memory cards such as MMC (Multimedia Card), SMC (Smart Media Card), xD (eXtreme Digital)-Picture Card, etc., besides basic built-in memory.

There are two typical sockets for installing a removable memory card (hereinafter also termed simply "memory card").

One is a push-type memory card socket using a well-known hook switch. The push-type memory card socket is installed in a mainboard of a terminal, and the hook switch is installed beside the socket. To install a memory card, a user inserts the memory card into a memory card slot defined at an outer side of the terminal and pushes the memory card inwardly to allow an electrical contact between the memory card and the socket. To remove the memory card, the user pushes the memory card again in the inserting direction to make the hook switch release and eject the memory card. That is, the installing and uninstalling of the memory card are carried out by the pushing actions. However, the push-type socket is not suitable for a small-sized memory card because the small-sized memory card can be easily bent or damaged by the pushing actions.

The other is a hinge-type memory card socket that is proposed to obviate the problems of the push-type memory card socket. The hinge-type memory card socket includes a cover of which one end is rotatably mounted on an upper side of the socket for a hinge motion. To install a memory card, a user opens the cover, inserts the memory card in the socket, and closes the cover. That is, the hinge-type memory card socket can be used regardless of the size of the memory card. The hinge-type memory card socket, mounted on a mainboard, must be exposed to the outside of a terminal for the user to install the memory card, and therefore the exposed side of the hinge-type memory socket is typically located at a rear side of the terminal to protect the exposed socket with a battery pack. However, it is inconvenient for the user to power off the terminal and remove the battery pack prior to installing the memory card.

As described above, the two types of sockets are not suitable for recently introduced very small-sized memory cards such as a trans-flash memory card having a width of less than 1 mm.

SUMMARY OF THE INVENTION

The present invention provides a socket for a trans-flash memory card, having an improved structure compared with a push-type memory card socket, such that a very small-sized memory card can be used without the risk of breakage.

Also, the present invention provides a socket for a trans-flash memory card, having an improved structure compared with a hinge-type memory card socket, such that a memory card can be installed in a mainboard of a terminal without removing a battery pack prior to installing the memory card.

Further, the present invention provides a socket for a trans-flash memory card, by which a thin, small-sized memory card can be installed and uninstalled without the risk of bending or damage.

Further, the present invention provides a socket for a trans-flash memory card, which allows a memory card to be installed/uninstalled into/from a terminal in a smooth and easy way, thereby increasing user's reliability of the terminal.

According to an aspect of the present invention, a socket for a trans-flash memory card includes: a tray socket mounted on a mainboard of a device and electrically connected thereto, the tray socket having a hook switch; a sliding tray insertable into the tray socket from a position extended from the device to make an electrical contact with the tray socket, the sliding tray being alternately retracted and extended by the hook switch when the sliding tray is repeatedly pushed; and a memory socket installed or formed on a top surface of the sliding tray, for accommodating a memory card and electrically connecting the memory card to the tray socket through the sliding tray.

According to another aspect of the present invention, a socket for a trans-flash memory card includes: a tray socket mounted on a mainboard of a device and electrically connected thereto, the tray socket having a hook switch; a sliding tray insertable into the tray socket from a position extended from the device to make an electrical contact with the tray socket, the sliding tray being alternately retracted and extended by the hook switch when the sliding tray is repeatedly pushed; a memory socket installed or formed on a top surface of the sliding tray, for accommodating a memory card and electrically connecting the memory card to the tray socket through the sliding tray; and an openable cover mounted above the memory socket to protect the accommodated memory card.

According to a further aspect of the present invention, a socket for a trans-flash memory card includes: a tray socket mounted on a mainboard of a device and electrically connected thereto, the tray socket having a hook switch; a sliding tray insertable into the tray socket from a position extended from the device to make an electrical contact with the tray socket, the sliding tray being alternately retracted and extended by the hook switch when the sliding tray is repeatedly pushed; a memory socket installed or formed on an top surface of the sliding tray, for accommodating a memory card and electrically connecting the memory card to the tray socket through the sliding tray; an openable cover mounted above the memory socket to protect the accommodated memory card; and a guide element for preventing the sliding tray from being separated from the tray socket.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

A slide-type portable wireless terminal using a removable memory card is illustrated to describe the present invention. However, the present invention is not limited to the illustrated terminal. The present invention can be applied to various kinds of devices having a memory card.

Figure 1:
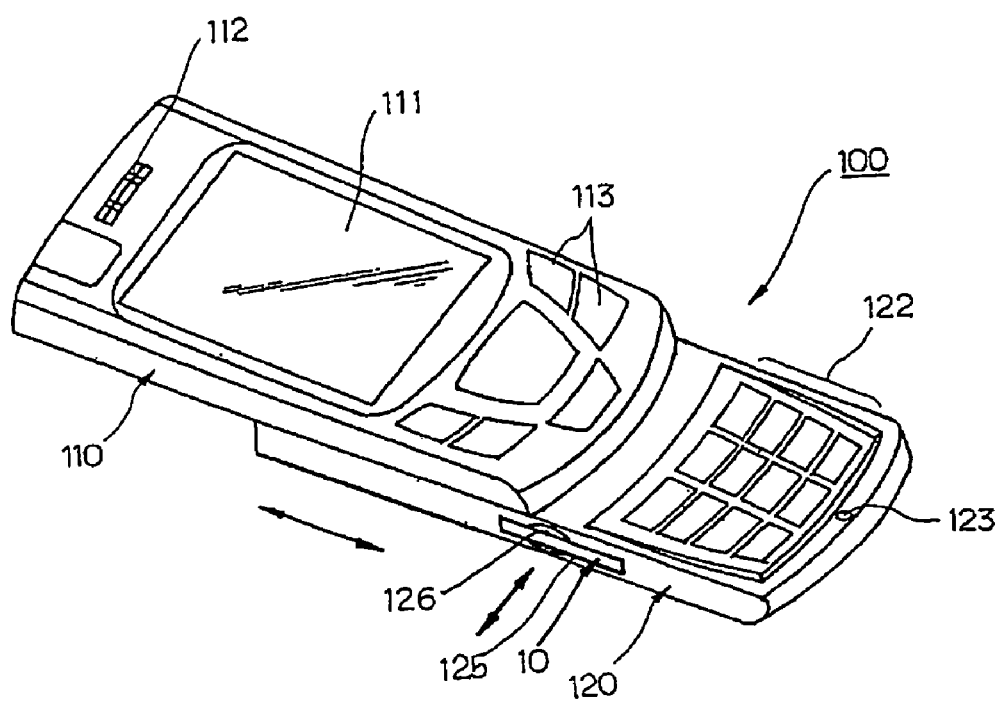
FIG. 1 is a perspective view of a portable wireless terminal in which a socket for a trans-flash memory card is installed according to the present invention.

FIG. 1 is a perspective view of a portable wireless terminal in which a socket for a trans-flash memory card is installed according to the present invention.

Referring to FIG. 1, a terminal 100 includes a main body 120 and a slide body 110 capable of limited sliding motion on the main body 120 in a longitudinal direction. The slide body 110 includes a display 111 on a front side and a speaker-equipped earpiece 112 above the display 111. The display 111 may be a wide color LCD module. Also, the slide body 110 may include key buttons 113 under the display 111. The key buttons 113 may be navigation key buttons. The main body 120 includes another set of key buttons 122 at a surface that is exposed to the outside when the slide body 110 is fully slid up. The key buttons 122 may be arranged in a 3×4 configuration. Also, the main body 120 includes a microphone 123 under the key buttons 122.

A tray slot 125, through which a memory card is to be inserted, is provided at a side of the wireless terminal 100. In detail, a sliding tray 10, containing a small-sized memory card such as a trans-flash memory card, is inserted and removed through the tray slot 125. A well-known hook switch is used for holding and releasing the sliding tray 10 according to one embodiment of the present invention. The hook switch holds the sliding tray 10 when the sliding tray 10 is pushed and the hook switch releases the sliding tray 10 when the sliding tray 10 is pushed again. Preferably, a recess 126 may be defined at the tray slot 125 for user's convenience in pushing the sliding tray 10.

Figure 2:
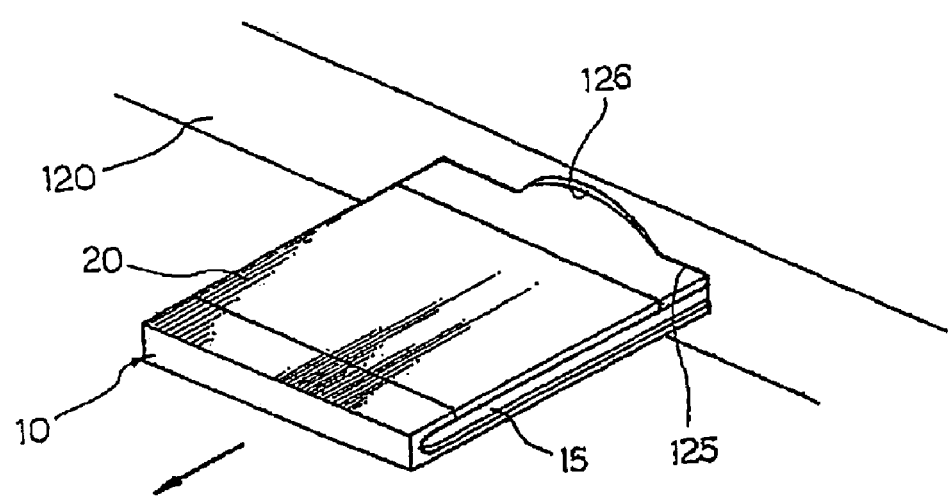
FIG. 2 is a partial perspective view showing a sliding tray extended from a terminal according to the present invention.
Figure 3:
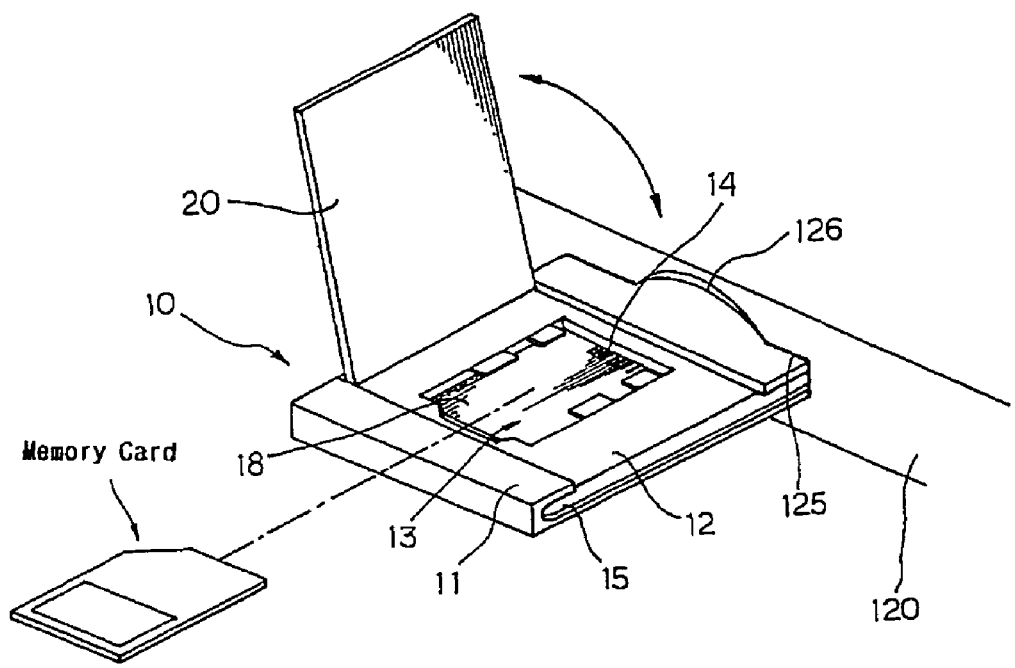
FIG. 3 is a partial perspective view showing a memory card installation in a sliding tray using a hinged cover according to the present invention.

FIG. 2 is a partial perspective view showing a sliding tray extended from a terminal according to the present invention, and FIG. 3 is a partial perspective view showing an memory card installation in a sliding tray using a hinged cover according to the present invention.

Referring to FIGS. 2 and 3, the sliding tray 10 may be made of plastic material with a rectangular shape. The material and shape of the sliding tray 10 may be changed according to a device to which the sliding tray 10 is to be applied.

The sliding tray 10 includes a recessed surface 12 lower than its top surface 11. A memory socket 13 may be installed in the recessed surface 12. For example, a well-known memory card socket may be used for the memory socket 13. Preferably, the sliding tray 10 may be formed including the memory socket 13 that has a card mount surface 18. The card mount surface 18 is lower than the recessed surface 12 and corresponds to the shape of a memory card to be mounted. A cover 20 is hinged to a portion of the recessed surface 12, for opening and closing motions. The cover 20 is provided to cover the memory card after inserting the memory card on the card mount surface 18 of the memory socket 13, such that the memory card can be protected from foreign substances. Also, the card mount surface 18 is provided with a top contact part 14, for an electrical connection with a contact part of the memory card (not shown).

Preferably, a top surface of the cover 20 is flush with the top surface 11 of the sliding tray 10 when the cover 20 is completely closed to protect the inserted memory card, such that the sliding tray 10 can slide smoothly without interference with the tray slot 125. Though the cover 20 is hinged to swing in a direction perpendicular to the sliding direction of the sliding tray 10, the direction of the cover swing motion may be changed according to application conditions and the shape of the sliding tray 10. Since the cover 20 is tightly closed, an additional locking element is not required. The guide slit 15 allows an easy pull on the closed cover 20, such that the tightly closed cover can be easily opened. However, a well-known locking element or a well-known cover may be used according to application conditions.

Figure 4:
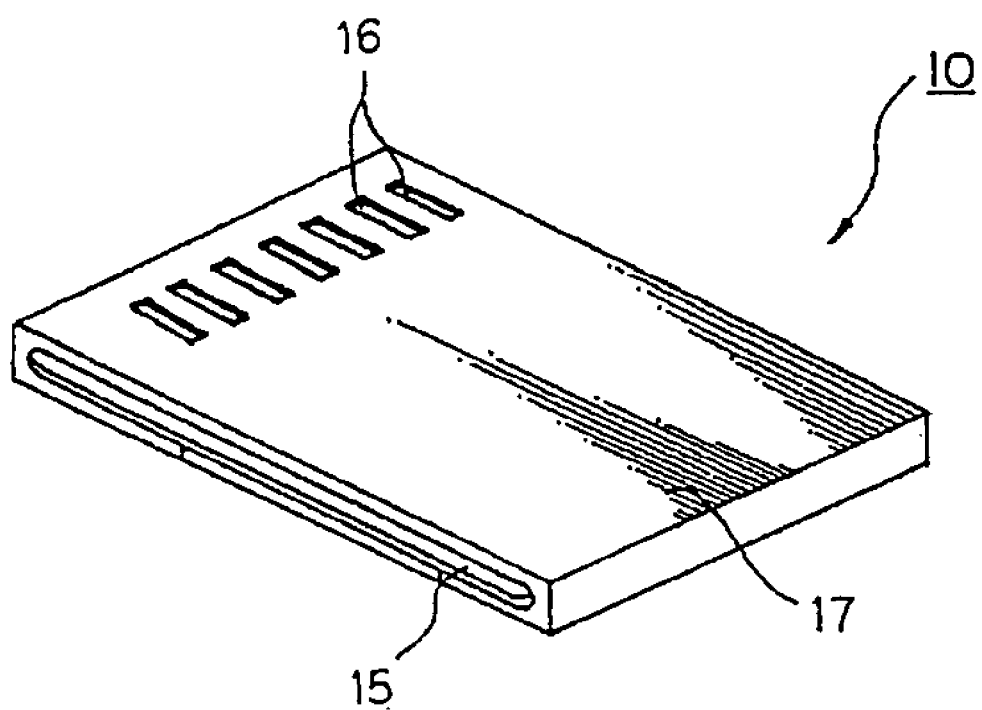
FIG. 4 is a bottom perspective view of a sliding tray according to the present invention.
Figure 5:
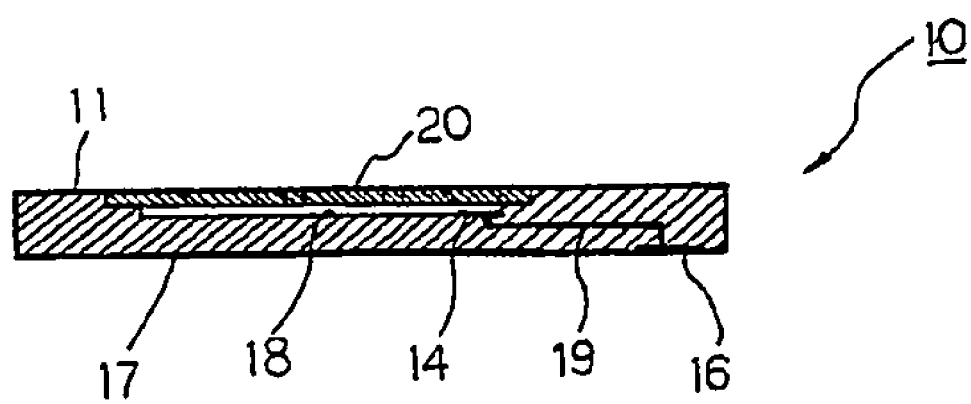
FIG. 5 is a sectional view showing electrical connections of a sliding tray according to the present invention.

FIG. 4 is a bottom perspective view of a sliding tray according to the present invention, and FIG. 5 is a sectional view showing electrical connections of a sliding tray according to the present invention.

Referring to FIGS. 4 and 5, the sliding tray 10 includes an exposed bottom contact part 16 at a bottom surface 17, for an electrical connection with a mainboard of a terminal. The bottom contact part 16 is electrically connected with the top contact part 14 of memory socket 13. In case the top contact part 14 and the bottom contact part 16 of the sliding tray 10 are spaced apart from each other, a predetermined connecting element may be used to electrically connect the top contact part 14 and bottom contact part 16. For example, a joint pin 19 may be used to connect the top contact part 14 and the bottom contact part 16, and the joint pin 19 may be insert molded in the sliding tray 10. The at least one joint pin being rigid during the retraction and extension of the sliding tray.

Figure 6:
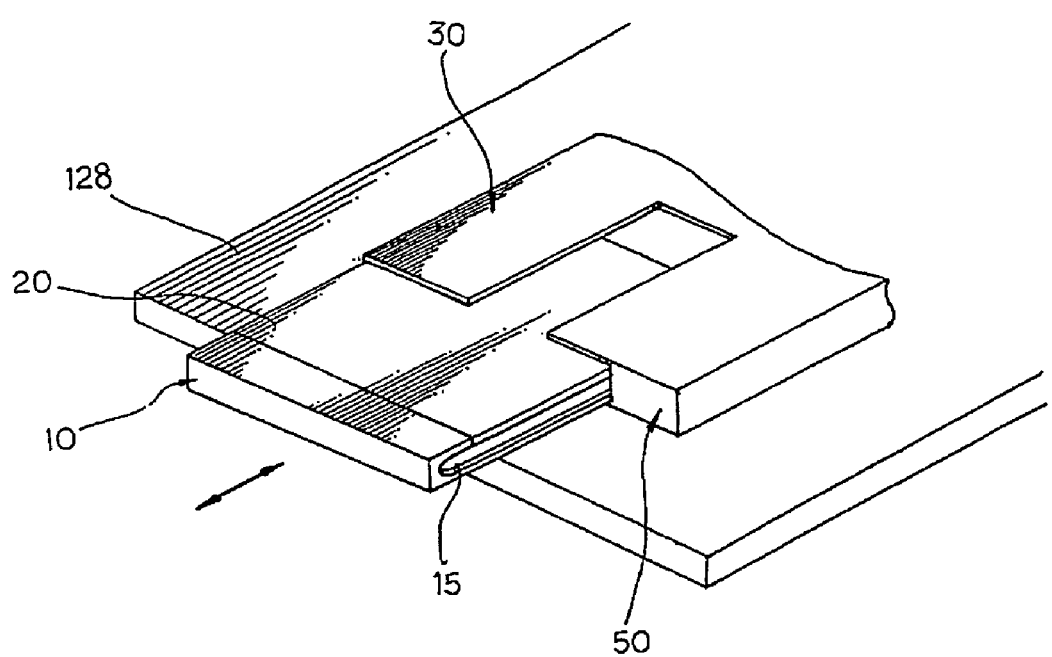
FIG. 6 is a partial perspective view showing retracting/extending movements of a sliding tray into/from a tray socket mounted on a terminal main board according to the present invention.
Figure 7:
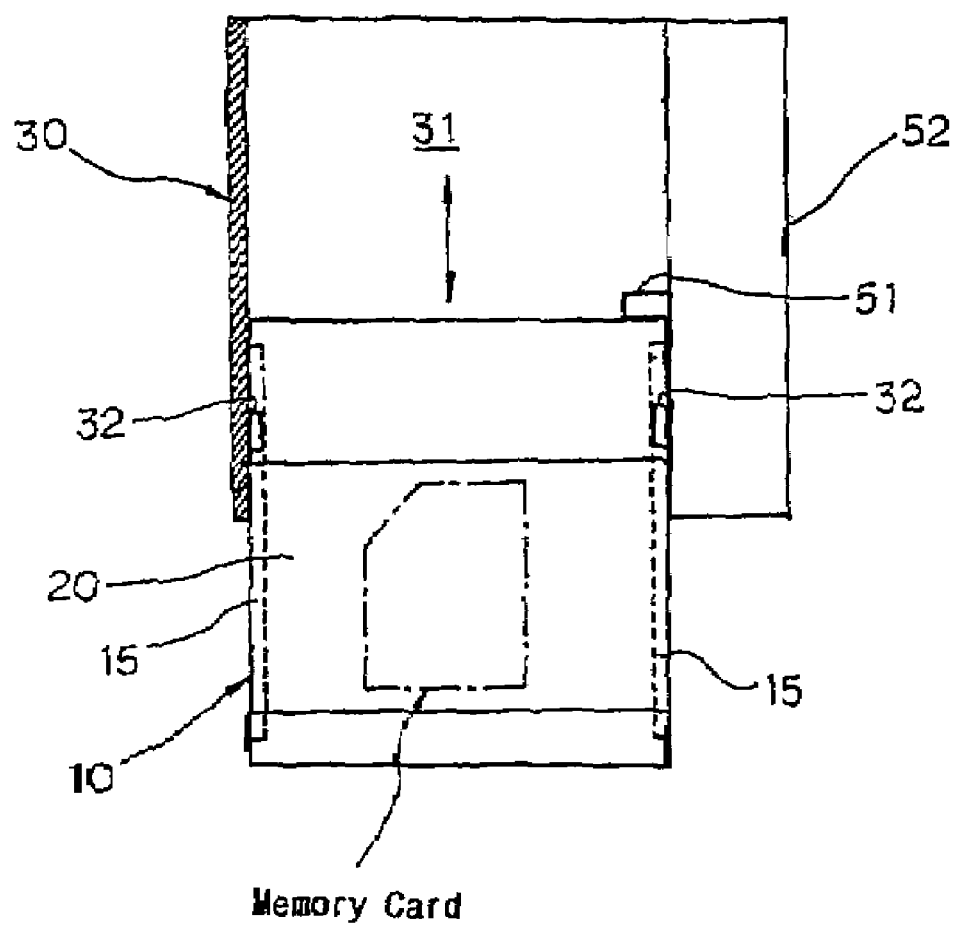
FIGS. 7 and 8 are plan views showing sliding tray movements in a tray socket according to the present invention.
Figure 8:
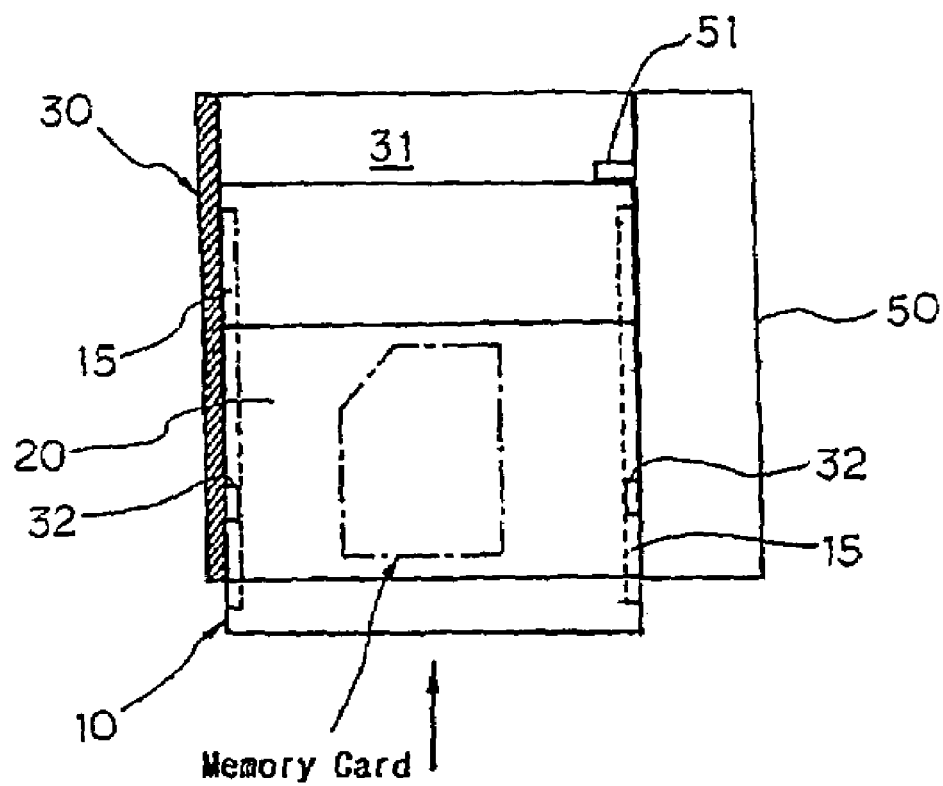

FIG. 6 is a partial perspective view showing retracting/extending movements of a sliding tray into/from a tray socket mounted on a terminal main board according to the present invention, and FIGS. 7 and 8 are plan views showing sliding tray movements in a tray socket according to the present invention.

Referring to FIGS. 6 through 8, a tray socket 30 is mounted on a mainboard 128 of the wireless terminal 100 by using a surface mount device (SMD), and the sliding tray 10 is slidably installed in an inner space 31 of the tray socket 30. The tray socket 30 is provided at one side with a hook slider 50. The hook slider 50 includes a protruded hook 51 capable of a limited sliding motion to confine the sliding tray 10 between its extended position and retracted position. The hook slider 50 locks sliding tray 10 when the sliding tray 10 is pushed in the tray socket 30 and unlocks the sliding tray 10 when the locked sliding tray 10 is pushed again in the same direction. Because the hook slider 50 has substantially the same structure as the well-known hook switch, a detail description of the hook slider 50 will be omitted.

The sliding tray 10 may be removably constructed with the wireless terminal 100. However, in the present invention, the sliding tray 10 is irremovable from the tray socket 30 in order to prevent a loss of the sliding tray 10. Therefore, there is provided a guide element to guide the sliding tray 10 in the tray socket 30 without separation.

The guide element includes at least one longitudinal guide slit 15 and at least one guide protrusion 32. The guide slit 15 is formed at an outer surface of the sliding tray 10 with its both ends being closed. The guide protrusion is formed at the tray socket 30 and slidably engaged with the guide slit 15 for guiding the retracting and extending movements of the sliding tray.

Preferably, the guide slit 15 is formed at each side of the sliding tray 10 and the guide protrusion 32 is formed at each side in the tray socket 30.

Figure 9:
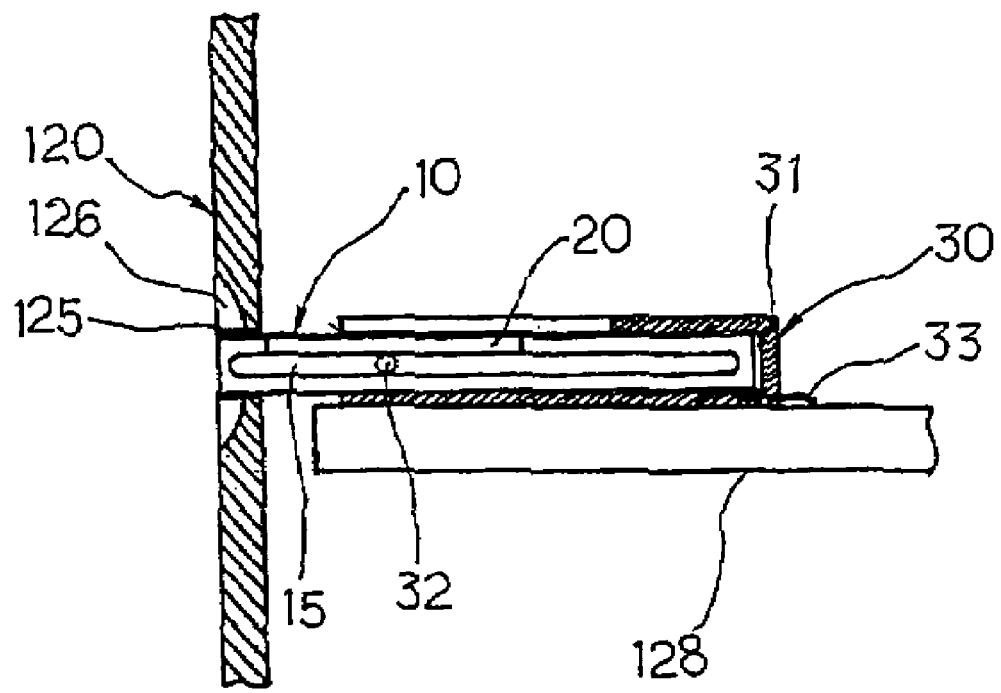
FIGS. 9 and 10 are sectional views showing retracted/extended positions of a sliding tray into/from a terminal according to the present invention.
Figure 10:
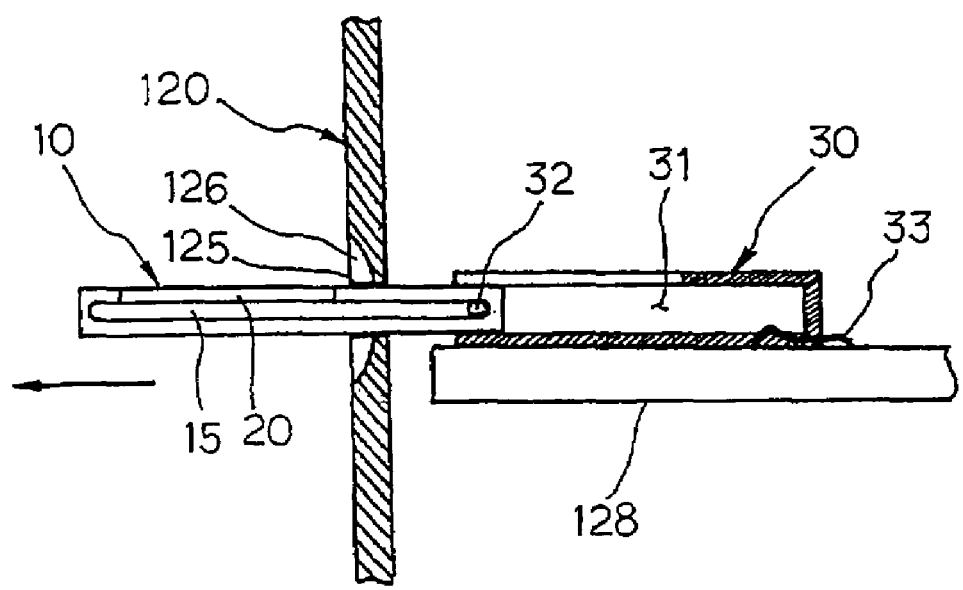

FIGS. 9 and 10 are sectional views showing retracted/extended positions of a sliding tray into/from a terminal according to the present invention. The installing and uninstalling operation of the sliding tray 10 will be described with reference to FIGS. 7 through 10.

To install a memory card in the wireless terminal 100, a user pushes the retracted sliding tray 10 inwardly to partially eject the sliding tray 10 from the tray socket 30 (refer to the arrow in FIG. 10 for the eject direction), and then opens the cover 20 forming the top surface of the sliding tray 10 in order to expose the memory socket 13. After that, the user puts the memory card in the memory socket 13 and tightly closes the cover 20 with its surface being flush with the top surface 11 of the sliding tray 10. By pushing the sliding tray 10 inwardly, the user can lock the sliding tray 10 in the tray socket 30, thereby completing installation of the memory card. Herein, the memory card, the top contact part 14 of the memory socket 13 (refer to FIG. 3) of the sliding tray 10, the bottom contact part 16 of the sliding tray 10, a connecting pin 33 of the tray socket 30, and the mainboard 128 of the terminal are electrically connected in series. To remove the memory card from the wireless terminal 100, the user can use the same steps.

Instead of inserting a thin, small-sized memory card directly into a memory card slot of a terminal for an electrical connection with a mainboard, the memory card socket of the present invention uses the sliding tray to protect the thin, small-sized memory card, thereby preventing the risk of breakage and obviating the drawbacks of the related art push-type and hinge-type memory card sockets.

In this embodiment, though the cover 20 is provided in the sliding tray 10 to protect the memory card, the cover 20 can be omitted. That is, the scope of the present invention is mainly characterized by the sliding tray that is employed to prevent the risk of damage or breakage of the small-sized memory card during the installing and uninstalling of the small-sized memory card in a terminal.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A socket for a trans-flash memory card, comprising:
a tray socket mounted on a mainboard of a device and electrically connected thereto;
a sliding tray insertable into the tray socket from a position extended from the device to make an electrical contact with the tray socket, the sliding tray being alternately retracted and extended by a hook switch disposed in the device when the sliding tray is repeatedly pushed, the sliding tray having at least one joint pin for electrically connecting a first top surface of the sliding tray and at least one exposed bottom contact part disposed on a first bottom surface of the sliding tray, the first top surface being opposite the first bottom surface, the at least one joint pin being rigid during retraction and extension of the sliding tray; and
a memory socket provided on the first top surface, for accommodating a memory card and enabling an electrical connection between the memory card and the tray socket through the sliding tray via the at least one joint pin.

2. The socket of claim 1, wherein the sliding tray has means for preventing it from being separated from the tray socket.

3. The socket of claim 2, wherein the sliding tray includes at least one longitudinal guide slit at an outer surface thereof, the guide slit being closed at both ends, and the tray socket includes at least one guide protrusion to be inserted in the guide slit, for guiding the retracting and extending movements of the sliding tray.

4. The socket of claim 3, wherein the guide slit is formed at each side of the sliding tray and the guide protrusion is formed at each side in the tray socket.

5. The socket of claim 1, wherein when the sliding tray is retracted, the at least one exposed bottom contact part electrically contacts at least one connecting pin of the tray socket, the at least one connecting pin being electrically connected with the mainboard.

6. The socket of claim 5, wherein the at least one exposed bottom contact part is electrically connected with a top contact part provided in the memory socket via the at least one joint pin.

7. The socket of claim 1, wherein the memory socket is provided on a surface lower than the top surface of the sliding tray to prevent the accommodated memory card from protruding from the top surface of the sliding tray, to enable the sliding tray to be retracted and extended smoothly.

8. The socket of claim 7, wherein an openable cover is provided over the memory socket to protect the accommodated memory card.

9. The socket of claim 8, wherein an end of the cover is hinged to the top surface of the sliding tray, for opening and closing the cover.

10. The socket of claim 9, wherein opening and closing motions of the cover are perpendicular to retracting and extending directions of the sliding tray.

11. The socket of claim 10, wherein a top surface of the cover is flush with the top surface of the sliding tray for smooth retracting and extending movements of the sliding tray.

12. The socket of claim 1, wherein the sliding tray is flush with an outer surface of the device when the sliding tray is fully retracted.

13. The socket of claim 12, wherein the tray socket includes a recess having a predetermined depth around a position through which the sliding tray is inserted, to facilitate retracting and extending the sliding tray.

14. The socket of claim 1, wherein the hook switch is integrated into the tray socket.

15. A socket for a trans-flash memory card, comprising:
   a tray socket mounted on a mainboard of a device and electrically connected thereto; a sliding tray insertable into the tray socket from a position extended from the device to make an electrical contact with the tray socket, the sliding tray being alternately retracted and extended by a hook switch when the sliding tray is repeatedly pushed;
   a memory socket provided on a top surface of the sliding tray, for accommodating a memory card and electrically connecting the memory card to the tray socket through the sliding tray; and
   an openable cover mounted above the memory socket to protect the accommodated memory card.

16. The socket of claim 15, wherein an end of the cover is hinged to the top surface of the sliding tray, for opening and closing the cover.

17. The socket of claim 16, wherein opening and closing motions of the cover are perpendicular to retracting and extending directions of the sliding tray.

18. The socket of claim 17, wherein a top surface of the cover is flush with the top surface of the sliding tray for smooth retracting and extending movements of the sliding tray.

19. A socket for a trans-flash memory card, comprising:
   a tray socket mounted on a mainboard of a device and electrically connected thereto;
   a sliding tray insertable into the tray socket from a position extended from the device to make an electrical contact with the tray socket, the sliding tray being alternately retracted and extended when the sliding tray is repeatedly pushed;
   a memory socket provided on top surface of the sliding tray, for accommodating a memory card and electrically connecting the memory card to the tray socket through the sliding tray;
   an openable cover mounted above the memory socket to protect the accommodated memory card; and
   a guide element for preventing the sliding tray from being separated from the tray socket.

20. The socket of claim 19, wherein the guide element includes:
   at least one longitudinal guide slit at an outer surface of the sliding tray, the guide slit being closed at both ends; and
   at least one guide protrusion formed at the tray socket to be inserted in the guide slit, for guiding the retracting and extending movements of the sliding tray.

21. The socket of claim 20, wherein the guide slit is formed at each side of the sliding tray and the guide protrusion is formed at each side in the tray socket.

* * * * *